Patented Dec. 4, 1945

2,390,481

UNITED STATES PATENT OFFICE 2,390,481

MODIFIED FORMALDEHYDE-ACETONE RESIN AND PROCESS OF MAKING SAME

Thomas C. Whitner, Elizabeth, N. J., assignor to Chemical Laboratories, Inc., a corporation of New Jersey No Drawing. Application May 29, 1943,
Serial No. 489,254

11 Claims. (Cl. 260—9)

This invention relates to synthetic resins and the process for making same. It relates more particularly to synthetic resins made by condensation of acetone with formaldehyde, and especially to the modification of such resinous bodies.

Condensation of acetone and formaldehyde can be effected by interaction of these two substances in a liquid medium, e. g., water, with the aid of alkaline substances as catalysts. In general, if alkali metal hydroxides, such as sodium or potassium hydroxide, are employed as the condensing agents then the resulting product is a solid, water-insoluble resinous material. When less alkaline agents are used, for example, disodium hydrogen phosphate, the condensation product is a thick, viscous, water-soluble liquid. The latter may be changed into the insoluble, solid variety of resinous material by treatment with, say, sodium or potassium hydroxide.

I have noted that incorporation of certain gums with the water-soluble, liquid condensation product of acetone and formaldehyde and subsequent conversion of the water-soluble product to the water-insoluble variety yields synthetic resinous bodies exhibiting new and unexpected properties. As an illustration, particles of the modified resinous compositions (i. e., resinous bodies containing incorporated gums and made according to this invention) will adsorb a considerable quantity of water and thereby increase in size and become softer and at times even gelatinous. This phenomenon (appreciable and considerable adsorption of water) is observed even though the modified resins appear to be substantially insoluble or only very slightly soluble in water. Also, the modified resin when in the extended or swollen state will adsorb considerable proportions of materials, e. g., dyes, from aqueous solutions.

The modifying agents which I use in the compositions according to this invention are naturally-occurring gums which are water-soluble or readily dispersible in water to furnish a homogeneous liquid mass. They are secured as the exudations of plants and can be exemplified by substances such as gum arabic, gum tragacanth, gum ghatti and gum karaya. By the term readily dispersible in water is meant that the gums themselves can be dispersed (or dissolved) in water without the aid of any added or extraneous dispersing agent.

In making the resinous compositions suitable for my purpose, I carry out the reaction preferably in two steps. In the first step, the aldehyde and ketone are condensed in the presence of a small quantity of water or other suitable liquid and in the presence of an alkaline condensing agent such as disodium hydrogen phosphate, trisodium phosphate and the like. After the reaction is completed, the reaction mixture is evaporated to eliminate solvent (liquid medium) and/or unreacted substances. Any material which may separate, e. g., catalyst or condensing agent, due to the evaporation of liquid can be removed by filtration or by any other convenient procedure. The thick, viscous, water-soluble liquid, which is obtained as a residue, then is admixed with the modifying agent, which may be either in the solid state or in an aqueous dispersion or solution as may be necessary or desirable. Next, the condensing agent is added and resinification of the water-soluble condensation product incorporated with the water-soluble gum allowed to proceed at room temperature or resinification may be hastened by the application of heat. After resinification is complete, the resinous mass is broken into small pieces or particles and the latter washed with water (either warm or cold) to remove the condensing agent and other soluble material which may be present. The resin is then dried, either by exposure to the atmosphere or by means of a mild heating operation.

The following examples will illustrate my invention, but I do not wish to be limited by them. All proportions given therein are by weight unless otherwise stated.

*Example 1.*—To 15 parts of acetone dissolved in 15 parts of water was added a solution consisting of 1 part of crystalline disodium hydrogen phosphate and 0.25 part of crystalline trisodium phosphate dissolved in 5 parts of water. To this mixture (in a suitable container attached to a reflux condenser) were added 20 parts of formaldehyde, as trioxymethylene, in 4 equal portions. After addition of each portion, the mixture was warmed gently and also shaken until the trioxymethylene had dissolved. When all of the latter substance had been added, the resulting liquid was heated for several hours on a boiling water bath, then allowed to cool to room temperature and to remain at that temperature at least overnight.

Afterwards, the liquid was evaporated on a water bath until only a thick viscous syrup remained. The latter was cooled to room temperature, whereupon some insoluble material separated. This was removed by filtration. The viscous syrupy liquid obtained in this manner was employed in the following examples.

*Example 2.*—A solution was made by dissolving 1 part of gum arabic in 2 parts of water. A portion of this solution (0.834 part) was admixed with some of the syrup (0.671 part) from Example 1, and to the mixture was added a 40 per cent aqueous alcoholic solution of tetraethanol ammonium hydroxide (1 part). The resulting mixture was heated gently on a water bath until resinification took place and a solid mass was formed. This was broken into small pieces and washed with warm water and dried.

The resin when first formed was a soft, crumbly mass and very easily broken. On exposure to air it lost water and became hard and brittle, as was also the case with the resin particles after washing them with water and drying. When the hard, dry pieces of resin were kept in contact with water for some time they adsorbed considerable proportions of the liquid, became soft again, and increased in size. Exposure to air resulted in the loss of water from the swollen particles and a return to the hard compact condition. These phenomena (i. e., adsorption and loss of water by the resin particles) were observed several successive times with the same sample.

Example 3.—A portion of the resin from Example 2 was ground to powder form and then soaked in water until the particles were thoroughly saturated with the liquid. Excess liquid then was removed by filtration and the wetted and swollen particles were placed in a tall narrow tube so as to form a column of resin. Through this column was filtered a dilute aqueous solution of a red dye. It was noted that the particles adsorbed the dye and the solvent that came through the tube was colorless.

Before the capacity of the column of resin for adsorbing dye had been exhausted, the resin was removed from the tube and the deeply colored portion separated from the remaining non-colored material. The colored resin was extracted successively with hot water and with alcohol. In each case only very little color developed in the extracting liquid, thus indicating the high retaining power of the resin.

If dry, powdered resin was placed in the tube and the aqueous solution then poured in, flow of the liquid through the column of resin quickly stopped. This cessation of flow was due to adsorption of water by the resin and a simultaneous increase in its volume, which resulted in closure of any passage or passages for the solution through the mass of resin.

Example 4.—In this instance a solution consisting of 0.5 part of gum ghatti in 10 parts of water was used. This was admixed with the syrup from Example 1 in the proportion of 0.596 part of gum solution to 0.427 part of syrup, and to this mixture was added a 40 per cent aqueous alcoholic solution of tetraethanol ammonium hydroxide in the proportion of 1 part. The resulting mixture was warmed on a water bath, and resinification soon occurred with the formation of a soft jelly-like mass. The latter was washed with cold water until the washings were neutral to litmus paper and then was dried. During drying the resinous mass became quite hard nad brittle and shrank greatly in size. When this hard mass was broken into small pieces and the latter placed in contact with water, the resinous material adsorbed the liquid and became quite soft as well as larger in volume.

Example 5.—The resin syrup from Example 1 (in the proportion of 0.514 part) was admixed with the aqueous solution of gum arabic from Example 2 (in the proportion of 0.22 part) and to this mixture were added water (in the proportion of 1 part) and 20 per cent aqueous sodium hydroxide (in the proportion of 1 part). The resulting liquid mixture was heated gently and it soon changed to a soft, grainy mass. The latter was washed with cold water until the alkali was removed, and afterwards was dried.

The dry, hard resin was ground and placed in a narrow tube so that a column of resin was formed. Alcohol (a liquid not appreciably absorbed by the resin) could be filtered through the mass of resinous particles. When water (a liquid adsorbed by the resin) was substituted for alcohol, filtration of the aqueous liquid through the column of resinous particles soon ceased as the latter became swollen and increased in size, thereby stopping up or plugging the narrow tube.

Example 6.—A solution of gum tragacanth was made which consisted of 0.5 part of the gum in 15 parts of water. To 0.770 part of the syrup from Example 1 was added 0.22 part of the solution of gum tragacanth, and with this mixture was incorporated 1 part of an aqueous alcoholic 40 per cent solution of tetraethanol ammonium hydroxide. The resulting aqueous mixture was allowed to stand for two hours at room temperature and then warmed for a few minutes on a water bath. During this heating operation a small portion of liquid was lost by evaporation. One part more of the solution of tetraethanol ammonium hydroxide was added and heating continued. A stiff, jelly-like mass soon was formed. This was broken into small portions and washed well with cold water.

On exposure to the atmosphere the particles of resin soon lost adsorbed water and became hard, dry and brittle. When the dry portions were covered with water they again adsorbed this liquid and became swollen and also soft. The increase in size of the particles (on swelling) in this instance was not as great as that noted previously with the compositions made with gum arabic or with gum ghatti.

As previously mentioned, the modifying agents suitable for my purpose are naturally-occurring gums which are obtained from the exudations of various plants or trees and which are soluble in water or readily dispersed in this liquid without the aid of any dispersing or other agent. Such gums should be distinguished from resins which also are naturally-occuring, as for example rosin, and which are not water-soluble. The gums are admixed with the water-soluble condensation product of acetone and formaldehyde and the admixture then converted into a resinous composition by the action of an alkaline condensing agent and, if desired, also of heat.

Admixing of water-soluble condensation product and gum may be accomplished by employing an aqueous solution of each ingredient, as this method is one which permits of easy manipulation. The proportion of gum to water-soluble condensation product may be varied within wide limits, but for most purposes the proportion of gum need not be greater than about that of the water-soluble formaldehyde-acetone condensation product.

The alkaline condensing or polymerizing agents for conversion of the mixture of water-soluble substances into water-insoluble resinous compositions may be any inorganic or organic compound which is appreciably soluble in water and which contains one or more hydroxyl groups that are alkaline in character. Examples of such agents are alkali metals hydroxides (e. g., sodium or potassium hydroxide), alkali-earth metal hydroxides (such as calcium hydroxide or barium hydroxide), tetra-alkylol ammonium hydroxides (for example, tetraethanol ammonium hydroxide), tetra-alkyl ammonium hydroxides (e. g., tetraethyl ammonium hydroxide), and the like.

Resinification of the mixture of water-soluble gum and water-soluble formaldehyde-acetone condensation product can be hastened by the application of heat. However, only a mild heating operation is necessary to secure rapid reaction. In most instances a temperature of, say, 40°, 50°, or 60° C. will be sufficient, though in some instances a temperature as high as 100° C. will be found helpful in obtaining rapid conversion of the initial materials to the resinous composition.

What I claim is:

1. The process which comprises admixing a water-soluble naturally-occurring gum with a liquid water-soluble condensation product of acetone and formaldehyde, said liquid condensation product being prepared by reacting formaldehyde with acetone in an aqueous solution of an inorganic alkaline catalyst and concentrating said aqueous solution at a temperature of about 100° C. and at atmospheric pressure, adding a strongly alkaline condensing agent to said admixture of said gum and said liquid condensation product, and heating said admixture to a temperature greater than atmospheric temperature but not exceeding about 100° C., whereby a substantially water-insoluble resinous composition containing an incorporated water-soluble naturally-occurring gum is obtained.

2. The process which comprises admixing a water-soluble naturally-occurring gum with a liquid water-soluble condensation product of acetone and formaldehyde, said liquid condensation product being prepared by reacting formaldehyde with acetone in an aqueous solution of an inorganic alkaline catalyst and concentrating said aqueous solution at a temperature of about 100° C. and at atmospheric pressure, adding an alkali metal hydroxide to said admixture of said gum and said liquid condensation product, and heating said admixture to a temperature greater than atmospheric temperature but not exceeding about 100° C., whereby a substantially water-insoluble resinous composition containing an incorporated water-soluble naturally-occurring gum is obtained.

3. The process which comprises admixing a water-soluble naturally-occurring gum with a liquid water-soluble condensation product of acetone and formaldehyde, said liquid condensation product being prepared by reacting formaldehyde with acetone in an aqueous solution of an inorganic alkaline catalyst and concentrating said aqueous solution at a temperature of about 100° C. and at atmospheric pressure, adding a tetra-alkylol ammonium hydroxide to said admixture of said gum and said liquid condensation product, and heating said admixture to a temperature greater than atmospheric temperature but not exceeding about 100° C., whereby a substantially water-insoluble resinous composition containing an incorporated water-soluble naturally-occurring gum is obtained.

4. The process which comprises admixing a water-soluble naturally-occurring gum with a liquid water-soluble condensation product of acetone and formaldehyde, said liquid condensation product being prepared by reacting formaldehyde with acetone in an aqueous solution of an inorganic alkaline catalyst and concentrating said aqueous solution at a temperature of about 100° C. and at atmospheric pressure, adding tetra-ethanol ammonium hydroxide to said admixture of said gum and said liquid condensation product, and heating said admixture to a temperature greater than atmospheric temperature but not exceeding about 100° C., whereby a substantially water-insoluble resinous composition containing an incorporated water-soluble naturally-occurring gum is obtained.

5. A synthetic formaldehyde-acetone resin composition containing an incorporated water-soluble naturally-occurring gum and made by admixing said gum with a liquid water-soluble condensation product of acetone and formaldehyde, adding tetra-ethanol ammonium hydroxide to said admixture, and heating said admixture to a temperature greater than atmospheric temperature but not exceeding about 100° C., said liquid condensation product having been prepared by reacting acetone with formaldehyde in an aqueous solution of an inorganic alkaline catalyst and concentrating said aqueous solution at a temperature of about 100° C. and at atmospheric pressure.

6. A synthetic resin composition, according to claim 5, in which the water-soluble naturally-occurring gum is gum arabic.

7. A synthetic resin composition, according to claim 5, in which the water-soluble naturally-occurring gum is gum ghatti.

8. A synthetic resin composition, according to claim 5, in which the water-soluble naturally-occurring gum is gum tragacanth.

9. The process according to claim 4 in which the water-soluble naturally-occurring gum is gum arabic.

10. The process according to claim 4 in which the water-soluble naturally-occurring gum is gum tragacanth.

11. The process according to claim 4 in which the water-soluble naturally-occurring gum is gum ghatti.

THOMAS C. WHITNER.